Patented June 28, 1932

1,865,208

UNITED STATES PATENT OFFICE

NORMAN B. PILLING, OF WILKINSBURG, AND ROBERT E. BEDWORTH, OF PITTSBURGH, PENNSYLVANIA, ASSIGNORS TO WESTINGHOUSE ELECTRIC & MANUFACTURING COMPANY, A CORPORATION OF PENNSYLVANIA

METHOD OF PRODUCING A TEMPERATURE-SENSITIVE ELEMENT

No Drawing. Application filed February 4, 1921. Serial No. 445,022.

This invention relates to temperature-measuring devices, more especially to a novel temperature-sensitive element and a method of producing the same.

Heretofore, several types of temperature-sensitive elements have been utilized for the measurement of temperatures, especially high temperatures. One of such devices utilized the thermo-electric current produced at the junction of two metals placed at the point, the temperature of which was to be measured, another junction in series therewith being kept at a predetermined temperature, and the current produced being recorded in some suitable manner. Another device consisted in a metallic wire, such as platinum, the resistance of which changed with the temperature and thus provided a means for measuring the change in temperature through the change in resistance of the wire.

Our invention is based on the discovery that certain metallic oxides, when subjected to changing temperatures, have induced therein rapid and large changes of electrical resistance. We have found a number of oxides suitable for this purpose, especially oxides the electrical resistances of which decrease with increasing temperatures. In our observations we have discovered that the decrease in resistance with increase in temperature follows a well defined law which may be indicated by the equation $$R = BT^n$$

in which R designates the resistance, T the absolute temperature and $n$ and B are constants depending upon the particular oxide used, the coefficient $n$ being negative.

Cuprous oxide and nickel oxide are among the oxides chemically stable at high temperatures under oxidizing or neutral conditions, and exhibiting suitable properties. We have found that the resistance of cuprous oxide decreases with increasing temperature in accordance with the 10th power of the absolute temperature and that of nickel oxide in accordance with the 13th power of the absolute temperature. On account of the extreme sensitiveness of these materials to temperature changes, the use thereof, as temperature-sensitive elements for the measurement or control of high temperatures, is very suitable.

We have found that a temperature element of this type may be readily constructed in a very simple manner by providing a wire or other suitable form of the metal the oxide of which it is desired to use, and weld the ends of the same to suitable conductors, such as fine platinum or other wire of a non-oxidizable character. The material is then oxidized completely, at a suitable temperature, in oxygen. We preferably use the method described and claimed in the copending application of N. B. Pilling, Serial No. 431,290, filed December 16, 1920, and which issued as Patent 1,553,394, Sept. 15, 1925, on producing shaped oxides, and assigned to the Westinghouse Electric & Manufacturing Company. Only the metal forming the sensitive element of the device becomes oxidized, and the connection between the oxide thus formed and the platinum or other conductor leads is electrically good. The physical character of the oxide thus produced depends upon the temperature of its formation. We have found that, in general, shaped oxides of more suitable character are produced at the higher temperatures, and prefer, for example, to form cuprous-oxide elements at a temperature of 900° C. or above.

Such an element may be used in any suitable well-known manner for the detection of the currents flowing therethrough when subjected to an impressed electromotive force at varying temperatures. For instance, it may be made the variable resistance in a Wheatstone or other bridge circuit, or in a potentiometer, or to actuate any other suitable control circuit. When such circuits become unbalanced, the current may be used to operate relays to control the heat or power supply to a furnace, to record the temperature changes or to actuate a signal when a certain temperature is reached. The continuous manifestation of rapid variation in electrical resistance which these oxides show, down to ordinary room temperatures, renders feasible the employment of such an element as a temperature-sensitive device, limited only by the corresponding sensitivity of the control circuit.

The temperature-resistivity curve for cuprous oxide has been determined in the temperature range 0–1000° C., and the high-temperature coefficient was found to persist down through these temperatures. This renders the use of this material feasible as a sensitive element without regard to temperature limitations in the range 0–1000° C.

The temperature-resistivity curve of nickel oxide follows a new law below about 650° C. in which the temperature exponent is increased from 13 to 20, making it more sensitive at low temperatures. The high specific resistance of metallic oxides at room temperature (that of cuprous oxide being 400,000 ohms per cm$^3$), taken in conjunction with the method of production proposed, makes them suitable for high-resistance uses, where the temperature coefficient is not vital or where constant temperature can be maintained.

Although we have described the oxides of copper and nickel as being suitable for temperature-sensitive and resistance elements, it is to be understood that our invention is not limited to the use of oxides of such metals inasmuch as oxides and mixtures of oxides of other metals are also adapted for this purpose. We prefer, however, to use the oxides named on account of the extreme sensitiveness thereof to changes in temperature. We may form the oxide otherwise than as specified but we have found that, by following the method described in the above-identified application, a more coherent oxide is formed which is capable of withstanding rough treatment without breaking. It is not necessary to weld the ends of the metal, the oxide of which is to be used, to the conductor leads but other suitable means, such as soldering or clamping, may be utilized.

We claim as our invention:

1. A method of producing temperature-sensitive elements which comprises providing a copper wire, welding the ends thereof to platinum conductors and oxidizing the first-named metal.

2. A method of producing an element for measuring temperatures or controlling the current in electric circuits which comprises selecting a composite metallic body from a group consisting of nickel, copper, or an alloy of nickel and copper, securing the ends thereof to nonoxidizable metallic conductors and oxidizing the first named metal.

3. A method of producing temperature sensitive elements which comprises selecting a wire from a group of wires consisting of nickel, copper, or an alloy of nickel and copper, securing the ends thereof to platinum conductors and oxidizing the wire.

4. A method of producing a resistance element which comprises providing a metal in a suitable form, securing the ends thereof to metallic conductors and oxidizing the first named metal at a temperature of at least 900° C., in an atmosphere of oxygen.

5. A method of producing a resistance element which comprises providing a copper body, welding the ends thereof to metallic conductors and heating the copper body at a temperature of at least 900° C. in an atmosphere of oxygen.

In testimony whereof, we have hereunto subscribed our names this 10th day of February, 1921.

NORMAN B. PILLING.
ROBERT E. BEDWORTH.